D. W. & S. H. DAVIS.
GILL-NET.
No. 186,232. Patented Jan. 16, 1877.
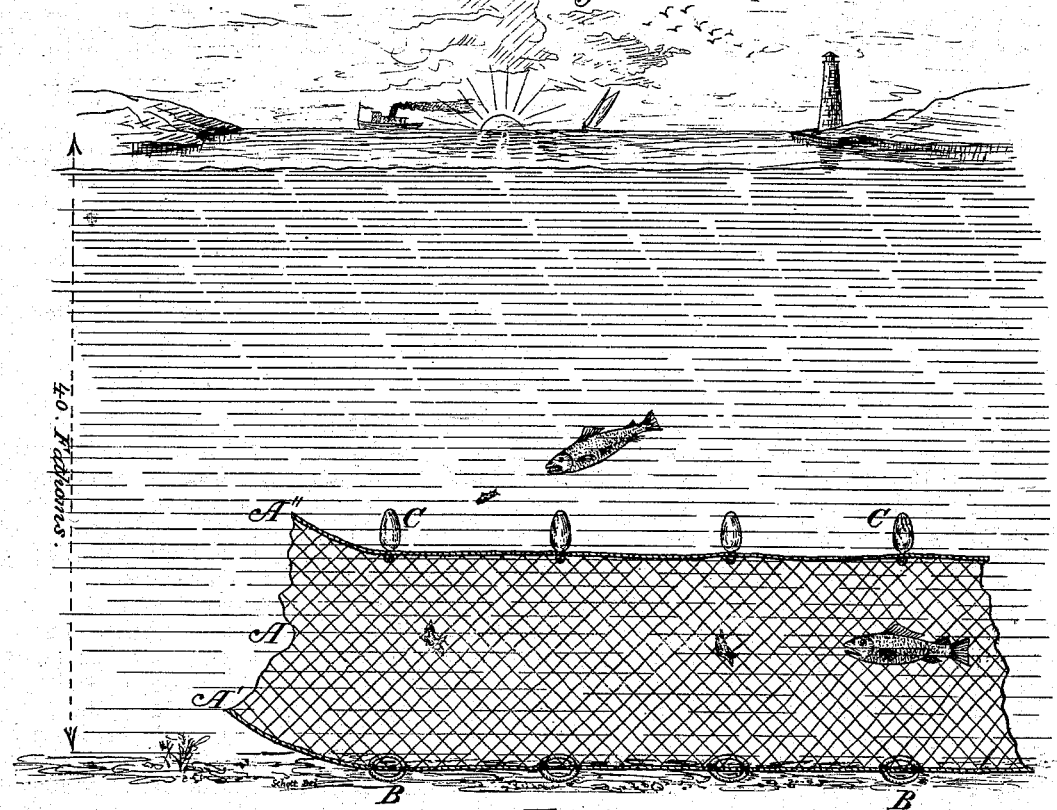
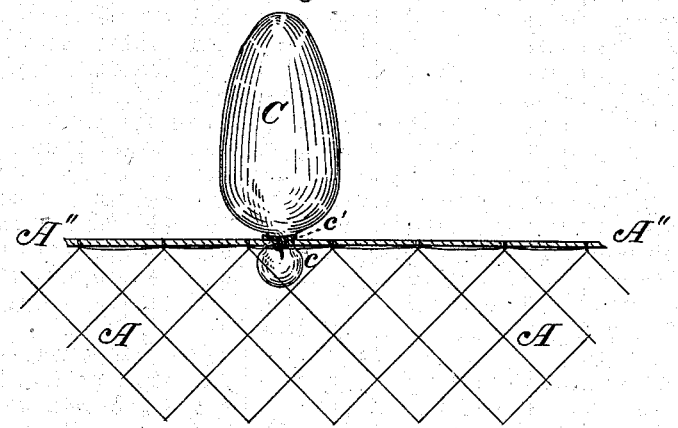
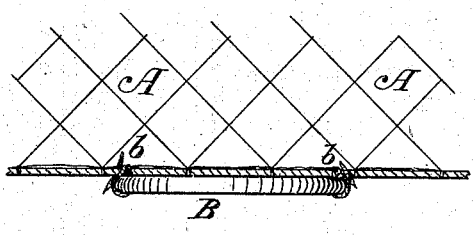

UNITED STATES PATENT OFFICE.

DAVID W. DAVIS AND SAMUEL H. DAVIS, OF DETROIT, MICHIGAN.

IMPROVEMENT IN GILL-NETS.

Specification forming part of Letters Patent No. 186,232, dated January 16, 1877; application filed December 19, 1876.

*To all whom it may concern:*

Be it known that we, DAVID W. DAVIS and SAMUEL H. DAVIS, of Detroit, in the county of Wayne, in the State of Michigan, have made certain Improvements in Gill-Nets for catching fish in deep water, of which the following is the specification:

The invention consists in a novel float that holds the net in an upright or perpendicular position in the water after the sinker rests upon and holds the bottom line upon the ground under the water, as will be fully hereinafter described.

In the drawings, Figure 1 represents a side view of a gill-net in position in deep water, having the sinkers and floats attached, and Fig. 2 is an enlarged view of the same.

A represents the net-work of an ordinary gill-net; A′, the sinker or bottom line; A″, the float or upper line; B, the sinker, which is of any heavy metal, in the form of a ring. It is attached to the bottom line by strong cords, as seen at $b$, or by any other secure means. C is the float, made of glass, is hollow, perfectly water-tight, and made as light as is consistent with strength necessary to prevent breaking in the ordinary way of handling the net. This float, being of glass, and transparent, is not seen by the fish when submerged in water, as it assumes the same color as the surrounding water, it being light in material, has great sustaining power when submerged in water, and is a great improvement over either light wood or cork for such purpose, as either wood or cork become water-soaked when submerged to the depth of two or three hundred feet in water, and after a little while is almost as heavy as the surrounding water, and no matter how light-colored they may be when first used, they soon change to a dark color, and will consequently be seen by the fish, who will invariably avoid them or near proximity to them, while the glass float does not change its color perceptibly, or become heavier by any length of time in the water, as it is impervious thereto.

The form of the glass float may be spherical, elliptical, coniform, or other convenient form; but we prefer the shape represented, with a button or ball, $c$, and neck $c′$, by which the float is securely attached to the float-line A″ by cord or other suitable device passing around the neck $c′$ of the float, and around the float-line A″. The glass float C, when constructed and attached to the upper or float line A″, has just floating power enough to hold the net A in a perpendicular position, while the sinkers are heavy enough to prevent the floats from raising them and the net from the bottom, where the sinkers rest; and when the net is in such position, it and the floats remain in a stationary condition, as they are so far submerged below the surface of the water that they are not affected by wind or swell upon the surface, and are not moved except when taken up to remove the fish that may be caught in the meshes of the net.

Having thus described our invention, what we claim is—

The glass floats C, in combination with a gill-net, A, arranged to operate as and for the purposes substantially as described.

DAVID W. DAVIS.
SAMUEL H. DAVIS.

Witnesses:
ED. E. KANE,
HENRY F. DUSING.